US011843770B2

(12) United States Patent
Chen et al.

(10) Patent No.: US 11,843,770 B2
(45) Date of Patent: *Dec. 12, 2023

(54) VIDEO CODING USING CROSS-COMPONENT LINEAR MODEL

(71) Applicant: BEIJING DAJIA INTERNET INFORMATION TECHNOLOGY CO., LTD., Beijing (CN)

(72) Inventors: Yi-Wen Chen, San Diego, CA (US); Xianglin Wang, San Diego, CA (US); Xiaoyu Xiu, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/732,483

(22) Filed: Apr. 28, 2022

(65) Prior Publication Data

US 2022/0256142 A1 Aug. 11, 2022

Related U.S. Application Data

(63) Continuation of application No. 17/372,340, filed on Jul. 9, 2021, now Pat. No. 11,405,609, which is a (Continued)

(51) Int. Cl.
*H04N 19/00* (2014.01)
*H04N 19/105* (2014.01)
(Continued)

(52) U.S. Cl.
CPC ......... *H04N 19/105* (2014.11); *H04N 19/132* (2014.11); *H04N 19/176* (2014.11); *H04N 19/186* (2014.11)

(58) Field of Classification Search
CPC .. H04N 19/105; H04N 19/132; H04N 19/176; H04N 19/186
See application file for complete search history.

(56) References Cited

U.S. PATENT DOCUMENTS

2012/0328013 A1 12/2012 Budagavi et al.
2015/0350687 A1 12/2015 Zhai et al.
(Continued)

FOREIGN PATENT DOCUMENTS

KR 20130050902 5/2013
KR 102140110015 A 9/2014
(Continued)

OTHER PUBLICATIONS

Aroche, Guillaume et al., "CE3-5.1: On cross-component linear model simplification", Joint Video Experts Team (JVET) of ITU-T SG 16 WP 3 and ISO/IEC JTC 1/SC 29/WG 11, Document: JVET-L0191, 12th Meeting: Macao, China, Oct. 3-12, 2018, (4p).
(Continued)

*Primary Examiner* — Zhihan Zhou
(74) *Attorney, Agent, or Firm* — Arch & Lake LLP

(57) ABSTRACT

A method and a computing device are provided for video coding. The method may include deriving parameter α and parameter β for a CCLM mode by using a predetermined number of neighboring reconstructed luma samples and chroma samples in a CU; and generating a final chroma predictor for the chroma samples of the CU by using the parameter α and the parameter β.

12 Claims, 8 Drawing Sheets

Related U.S. Application Data continuation of application No. PCT/US2020/012814, filed on Jan. 8, 2020.

(60) Provisional application No. 62/790,459, filed on Jan. 9, 2019.

(51) Int. Cl.
*H04N 19/132* (2014.01)
*H04N 19/176* (2014.01)
*H04N 19/186* (2014.01)

(56) References Cited

U.S. PATENT DOCUMENTS

| | | | |
|---|---|---|---|
| 2017/0366818 | A1 | 12/2017 | Zhang et al. |
| 2018/0176594 | A1 | 6/2018 | Zhang et al. |
| 2018/0288425 | A1 | 10/2018 | Panusopone et al. |
| 2021/0136409 | A1* | 5/2021 | Ma .................. H04N 19/176 |

FOREIGN PATENT DOCUMENTS

| | | | |
|---|---|---|---|
| KR | 1020160105944 | A | 9/2016 |
| KR | 102180037575 | A | 4/2018 |
| KR | 1020180037575 | A | 4/2018 |
| WO | 2018053293 | A1 | 3/2018 |
| WO | 2018118940 | A1 | 6/2018 |
| WO | 2018225593 | A1 | 12/2018 |
| WO | 2019004283 | A1 | 1/2019 |

OTHER PUBLICATIONS

International Search Report of PCT Application No. PCT/US2020/012814 dated Apr. 27, 2020, (3p).

Guillaume Laroche et al., CE3-5.1: On cross-component linear model simplification, Joint Video Experts Team (JVET) of ITU-T SG 16 WP 3 and ISO/IEC JTC 1/SC 29/WG 11, JVET-L0191, 12th Meeting, Maco, CN. pp. 1-4, Oct. 12, 2018, (xp).

Kai Zhang et al., CE3-related: CCLM prediction with single-line neighbouring luma samples, Joint Video Experts Team (JVET) of ITU-T SG 16 WP 3 and ISO/IEC JTC 1/SC 29/WG 11, JVET-L329-v2, 12th Meeting, Macao CN, pp. 1-4, Oct. 12, 2018, (xp).

Guillaume Laroche, et al. "Non-CE3: On cross-component linear model simplification," Joint Video Experts Team (JVET) of ITU-T SG 16 WP 3 and ISO/IEC JTC 1/SC 29/WG 11, JVET-K0204-v3, 11th Meeting: Ljubljana, SI, Jul. 2018, (7p).

Junyan Huo, et al., "CE3-related: Fixed Reference Samples Design for CCLM," Joint Video Experts Team (JVET) of ITU-T SG 16 WP 3 and ISO/IEC JTC 1/SC 29/WG 11, JVET-M0211-v1, 13th Meeting: Marrakech, MA, Jan. 3, 2019, (9p).

Jangwon Choi, et al., "CE3-related: Reduced No. of reference samples for CCLM parameter calculation," Joint Video Experts Team (JVET) of ITU-T SG 16 WP 3 and ISO/IEC JTC 1/SC 29/WG 11, JVET-L0138-v2, 12th Meeting: Macao, CN, Oct. 2018, (5p).

Ma, Xiang et al., "CE3: Classification-based mean value for CCLM coefficients derivation (tests 2.5.1-2.5.4)", Joint Video Experts Team (JVET) of ITU-T SG 16 WP 3 and ISO/IEC JTC 1/SC 29/WG 11, JVET-M0401-v1, 13th Meeting: Marrakech, MA, Jan. 9-18, 2019, (6p).

Wang, Meng et al.,"CE3-related: Modified linear model derivation for CCLM modes", Joint Video Experts Team (JVET) of ITU-T SG 16 WP 3 and ISO/IEC JTC 1/SC 29/WG 11, JVET-M0274, 13th Meeting: Marrakech, MA Jan. 9-18, 2019, (4p).

Choi, Jangwon et al., "CE3-related: Reduced number of reference samples for CCLM parameter calculation", Joint Video Experts Team (JVET) of ITU-T SG 16 WP 3 and ISO/IEC JTC 1/SC 29WG 11, JVET-L0138-v2, 12th Meeting: Macao, China Oct. 3-12, 2018, (6p).

Chen, Jianle et al., "Algorithm description for Versatile Video Coding and Test Model 3 (VTM 3)", Joint Video Experts Team (JVET) of ITU-T SG 16 WP 3 and ISO/IEC JTC 1/SC 29/WG 11, 12th Meeting: Macao, China Oct. 3-12, 2018, (48p).

\* cited by examiner

US 11,843,770 B2

VIDEO CODING USING CROSS-COMPONENT LINEAR MODEL

CROSS-REFERENCE TO RELATED APPLICATION

This application is a continuation of U.S. application Ser. No. 17/372,340 filed on Jul. 9, 2021, which is a continuation of International Application No.: PCT/US2020/012814, filed on Jan. 8, 2020, which claims the benefit of U.S. Provisional Application No. 62/790,459 filed on Jan. 9, 2019. The entire disclosure of the aforementioned application is incorporated herein by reference in its entirety.

FIELD

The present disclosure relates generally to video coding and compression. More specifically, this disclosure relates to systems and methods for performing video coding using Cross-Component Linear Model. In particular example embodiments, methods are described by which a final chroma predictor for the chroma samples of a coding unit.

BACKGROUND

This section provides background information related to the present disclosure. The information contained within this section should not necessarily be construed as prior art.

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, coding techniques with better compression efficiency are needed.

SUMMARY

This section provides a general summary of the disclosure, and is not a comprehensive disclosure of its full scope or all of its features.

According to a first aspect of the present disclosure, a video coding method is performed at a computing device having one or more processors and memory storing a plurality of programs to be executed by the one or more processors. The method includes deriving a first parameter $\alpha$ and a second parameter $\beta$ for a cross-component linear model (CCLM) mode by using a predetermined number of neighboring reconstructed luma samples and chroma samples in a coding unit (CU); and generating a final chroma predictor for the chroma samples of the CU by using the first parameter $\alpha$ and the second parameter $\beta$.

According to a second aspect of the present disclosure, a computing device is provided. The computing device includes at least one processor; a non-transitory storage coupled to the one or more processors; and a plurality of programs stored in the non-transitory storage that, when executed by the processor, cause the computing device to perform acts comprising: deriving a first parameter $\alpha$ and a second parameter $\beta$ for a cross-component linear model (CCLM) mode by using a predetermined number of neighboring reconstructed luma samples and chroma samples in a coding unit (CU); and generating a final chroma predictor for the chroma samples of the CU by using the first parameter $\alpha$ and the second parameter $\beta$.

BRIEF DESCRIPTION OF THE DRAWINGS

Hereinafter, sets of illustrative, non-limiting embodiments of the present disclosure will be described in conjunction with the accompanying drawings. Variations of structure, method, or functionality may be implemented by those of ordinary skill in the relevant art based on the examples presented herein, and such variations are all contained within the scope of the present disclosure. In cases where no conflict is present, the teachings of different embodiments may, but need not, be combined with one another.

DETAILED DESCRIPTION

The terms used in the present disclosure are directed to illustrating particular examples, rather than to limit the present disclosure. The singular forms "a" "an" and "the" as used in the present disclosure as well as the appended claims also refer to plural forms unless other meanings are definitely contained in the context. It should be appreciated that the term "and/or" as used herein refers to any or all possible combinations of one or more associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to," depending on the context.

Reference throughout this specification to "one embodiment," "an embodiment," "another embodiment," or the like in the singular or plural means that one or more particular features, structures, or characteristics described in connection with an embodiment are included in at least one embodiment of the present disclosure. Thus, the appearances of the phrases "in one embodiment" or "in an embodiment," "in another embodiment," or the like in the singular or plural in various places throughout this specification are not necessarily all referring to the same embodiment. Furthermore, the particular features, structures, or characteristics in one or more embodiments may be combined in any suitable manner.

Conceptually, many video coding standards are similar, including those previously mentioned in the Background section. For example, virtually all video coding standards use block-based processing, and share similar video coding block diagrams to achieve video compression.

Figure 1:
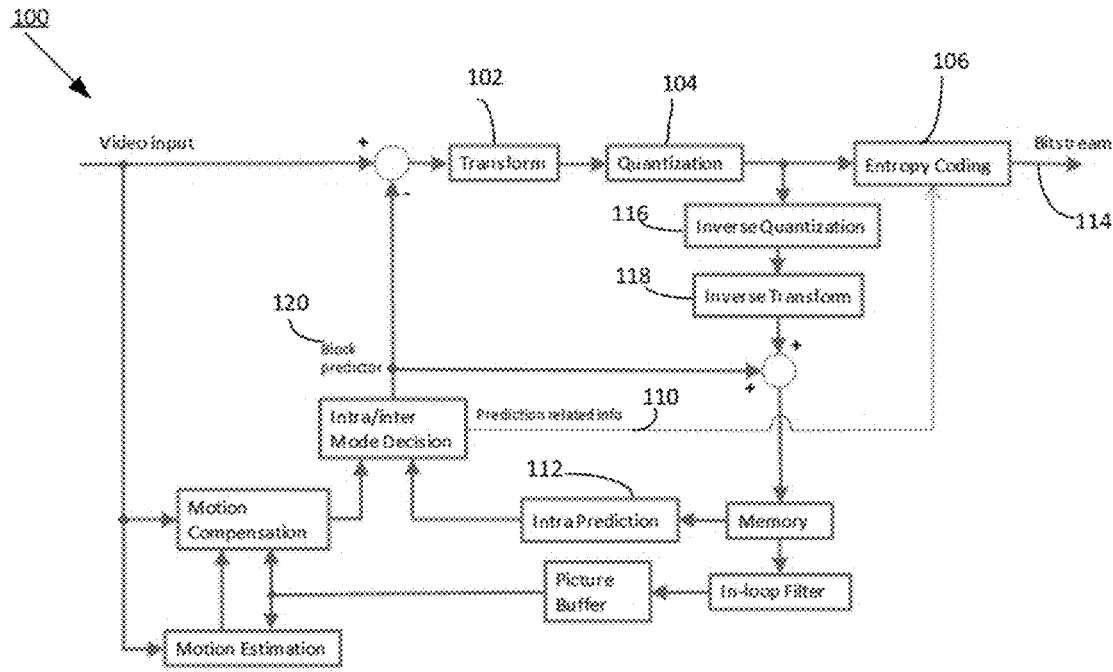
FIG. 1 is a block diagram setting forth an illustrative encoder which may be used in conjunction with many video coding standards.

FIG. 1 shows a block diagram of an illustrative encoder 100 which may be used in conjunction with many video coding standards. In the encoder 100, a video frame is partitioned into a plurality of video blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a Transform circuitry 102. Transform coefficients are then sent from the Transform circuitry 102 to a Quantization circuitry 104 for entropy reduction. Quantized coefficients are then fed to an Entropy Coding circuitry 106 to generate a compressed video bitstream. As shown in FIG. 1, prediction-related information 110 from an inter prediction circuitry and/or an Intra Prediction circuitry 112, such as video block partition info, motion vectors, reference picture index, and intra prediction mode, are also fed through the Entropy Coding circuitry 106 and saved into a compressed video bitstream 114.

In the encoder 100, decoder-related circuitries are also needed in order to reconstruct pixels for the purpose of prediction. First, a prediction residual is reconstructed through an Inverse Quantization 116 and an Inverse Transform circuitry 118. This reconstructed prediction residual is combined with a Block Predictor 120 to generate unfiltered reconstructed pixels for a current video block.

To improve coding efficiency and visual quality, an in-loop filter is commonly used. For example, a deblocking filter is available in AVC, HEVC as well as the current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
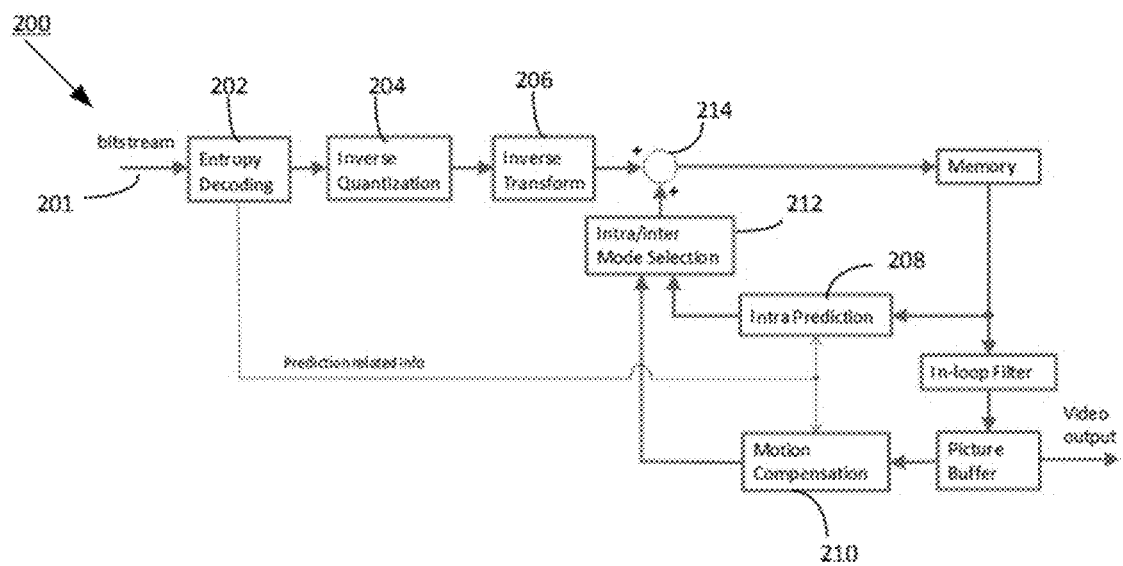
FIG. 2 is a block diagram setting forth an illustrative decoder which may be used in conjunction with many video coding standards.

FIG. 2 is a block diagram setting forth an illustrative decoder 200 which may be used in conjunction with many video coding standards. This decoder 200 is similar to the reconstruction-related section residing in the encoder 100 of FIG. 1. In the decoder 200 (FIG. 2), an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a Summer 214. In situations where an in-loop filter is turned on, a filtering operation is performed on these reconstructed pixels to derive the final reconstructed video for output.

Figure 4:
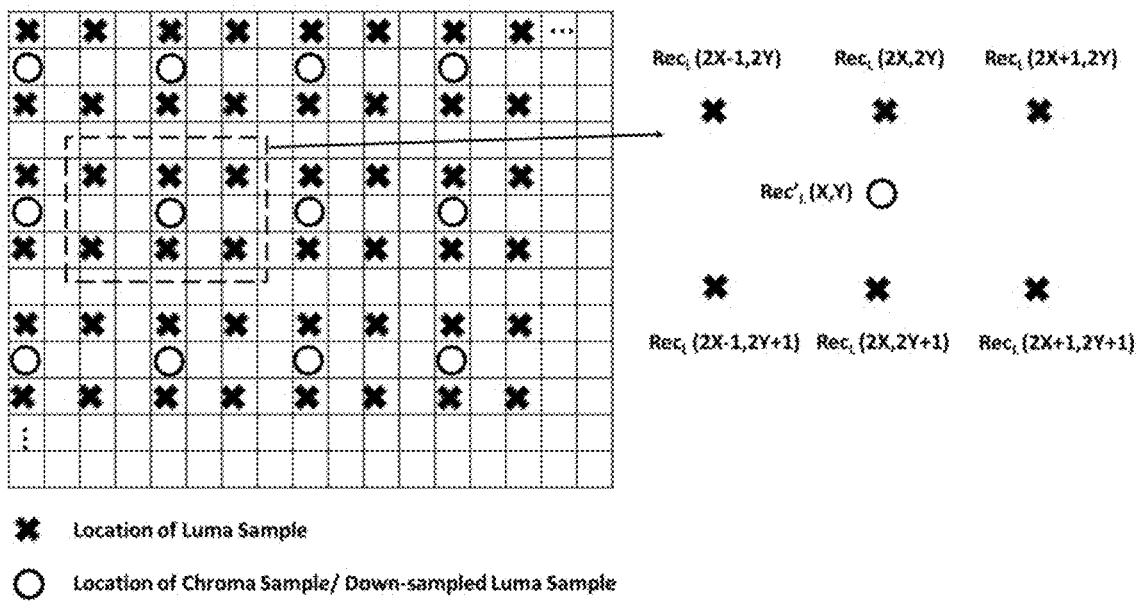
FIG. 4 is an example of Luma/Chroma Pixel Sampling Grid.

To reduce the cross-component redundancy, a cross-component linear model (CCLM) prediction mode is used in the VVC. The YUV format 4:2:0 is used in common test condition during the development of VVC and the sampling grid of the luma samples and the chroma samples for YUV format 4:2:0 is shown in FIG. 4. The coordinates of the luma samples and the chroma samples (down-sampled luma samples) are also illustrated in the FIG. 4. RecL' [x,y] represents the down-sampled top and left neighboring reconstructed luma samples, RecC'[x,y] represents the top and left neighboring reconstructed chroma samples, x and y are pixel index as shown in the figure. In this disclosure, we propose several methods to reduce the complexity of the derivation of the CCLM parameters.

The present disclosure relates generally to coding (e.g., encoding and decoding) video data. More specifically, this disclosure relates to video coding methods and computing device for reducing the cross-component redundancy for video coding methods. A CCLM predictor mode is used, for which the chroma samples are predicted based on the reconstructed luma samples of the same CU. A computing device, comprising: at least one processor; a non-transitory storage coupled to the one or more processors; and a plurality of programs stored in the non-transitory storage that, when executed by the processor, cause the computing device to perform acts of the video coding method.

Figure 3:
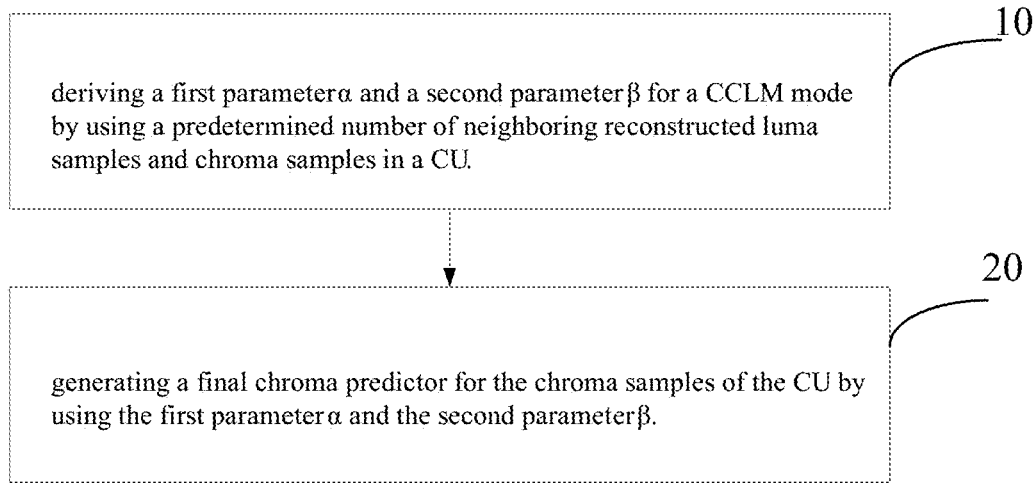
FIG. 3 is the flow chart of the video coding method.

As shown in FIG. 3, the video coding method includes at least following steps:

step 10: deriving a first parameter α and a second parameter β for a CCLM mode by using a predetermined number of neighboring reconstructed luma samples and chroma samples in a CU.

step 20: generating a final chroma predictor for the chroma samples of the CU by using the first parameter α and the second parameter β.

In step 20, to generate the final chroma predictor for the chroma samples of the CU by using following equation:

$$Pred_c(x, y) = \alpha * rec'_L(x, y) + \beta \qquad (1)$$

wherein $\text{pred}_c(x, y)$ is the final chroma predictor for the chroma samples of the CU, $\text{rec}_L'(x, y)$ is the downsampled reconstructed luma samples of the CU, x indicates a row index, y indicates a column index.

Figure 5:
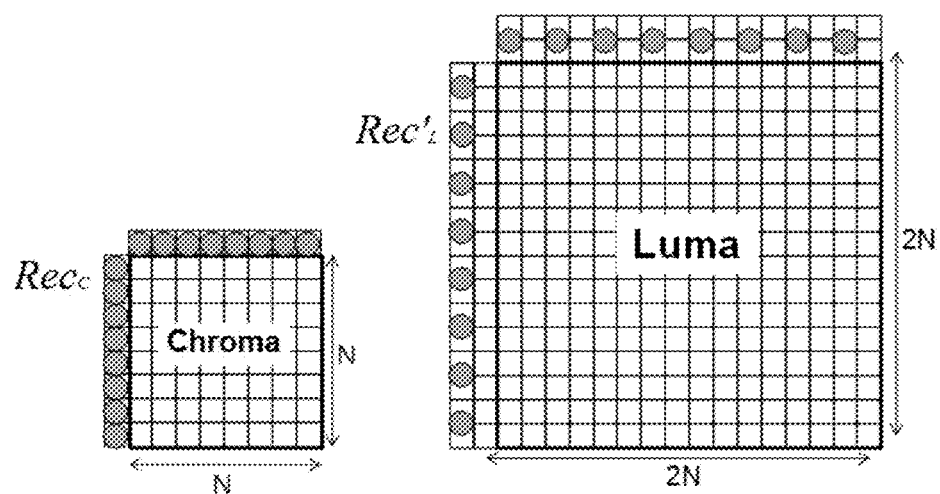
FIG. 5 shows the locations of the samples used for the derivation of $\alpha$ and $\beta$.

The coordinates of the luma samples and the chroma samples (down-sampled luma samples) are illustrated in the FIG. 5.

Parameter α and parameter β are derived by following equation (termed min-max method in the following sections):

$$\alpha = \frac{y_B - y_A}{x_B - x_A} \quad (2)$$

$$\beta = y_A - \alpha x_A$$

Each chroma sample and its corresponding luma sample are termed a sample pair. wherein $y_B$ is a chroma sample value of the maximum sample pair, $y_A$ is a chroma sample value of the minimum sample pair, $x_B$ is a luma sample value of the maximum sample pair, $x_A$ is a luma sample value of the minimum sample pair.

Figure 6:
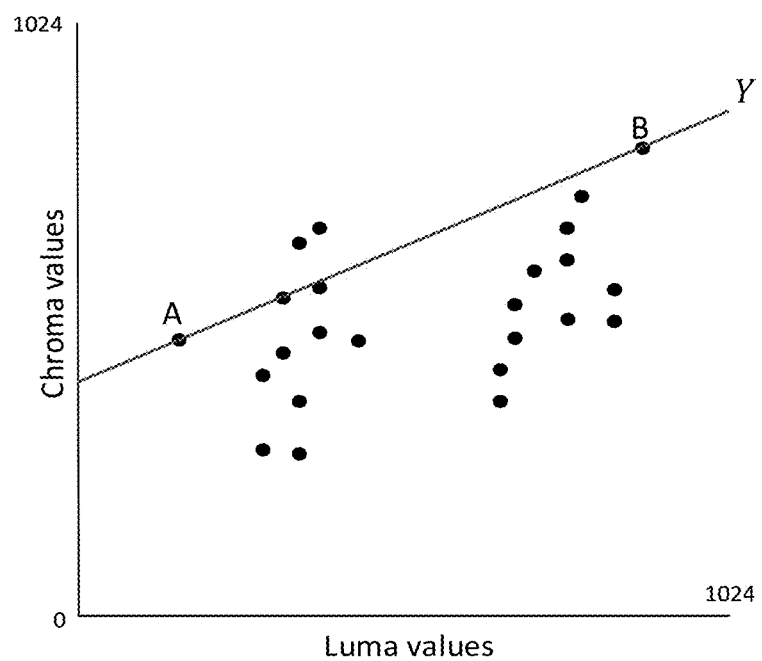
FIG. 6 shows the straight-line derivation of $\alpha$ and $\beta$ using the min-max method.

The 2 points (couple of luma and chroma) (A, B) are the minimum and maximum values inside the set of neighboring luma samples as depicted in FIG. 6. FIG. 6 is the illustration of the straight line between minimum and maximum luma value where the linear model parameter α and parameter β are obtained according to the equation (2).

In FIG. 5, $\text{Rec}_L'[x,y]$ represents the down-sampled top and left neighboring reconstructed luma samples, $\text{Rec}_c[x,y]$ represents the top and left neighboring reconstructed chroma samples, x indicates a row index, y indicates a column index. It is noted that the square blocks in FIG. 5 are the reconstructed luma samples which correspond to the locations of the luma samples depicted in FIG. 4; the circles in FIG. 5 corresponds to the locations of the chroma samples or down-sampled luma samples depicted in FIG. 4. For a coding block with a square shape, the min-max method is applied directly. For a non-square coding block, the neighboring samples of the longer boundary are first subsampled to have the same number of samples as for the shorter boundary. FIG. 5 shows the location of the left and above samples and the sample of the current block involved in the CCLM mode.

The min-Max method computation is performed as part of the decoding process and is not just as an encoder search operation. As a result, no syntax is used to convey the parameter α and parameter β values to the decoder. Currently, the equation/filter (3) is used as the luma downsampling filters to generate the down-sampled luma samples. However, different equations/filters could be selected to generate the down-sampled luma samples as shown in equation (3) to (19). It is noted that equations (5) to (10) can be regarded as direct taking sample without the down-sampling process.

$$Rec'_L[x, y] = (Rec_L[2x, 2y] * 2 + \quad (3)$$
$$Rec_L[2x + 1, 2y] + Rec_L[2x - 1, 2y] + Rec_L[2x, 2y + 1] * 2 +$$
$$Rec_L[2x + 1, 2y + 1] + Rec_L[2x - 1, 2y + 1] + 4) \gg 3$$

$$Rec'_L[x, y] = (Rec_L[2x, 2y] + Rec_L[2x, 2y + 1] + \quad (4)$$
$$Rec_L[2x + 1, 2y] + Rec_L[2x + 1, 2y + 1] + 2) \gg 2$$

$$Rec'_L[x, y] = Rec_L[2x, 2y] \quad (5)$$

$$Rec'_L[x, y] = Rec_L[2x + 1, 2y] \quad (6)$$

$$Rec'_L[x, y] = Rec_L[2x - 1, 2y] \quad (7)$$

$$Rec'_L[x, y] = Rec_L[2x - 1, 2y + 1] \quad (8)$$

$$Rec'_L[x, y] = Rec_L[2x, 2y + 1] \quad (9)$$

$$Rec'_L[x, y] = Rec_L[2x + 1, 2y + 1] \quad (10)$$

$$Rec'_L[x, y] = (Rec_L[2x, 2y] + Rec_L[2x, 2y + 1] + 1) \gg 1 \quad (11)$$

$$Rec'_L[x, y] = (Rec_L[2x, 2y] + Rec_L[2x + 1, 2y] + 1) \gg 1 \quad (12)$$

$$Rec'_L[x, y] = (Rec_L[2x + 1, 2y] + Rec_L[2x + 1, 2y + 1] + 1) \gg 1 \quad (13)$$

$$Rec'_L[x, y] = (Rec_L[2x, 2y + 1] + Rec_L[2x + 1, 2y + 1] + 1) \gg 1 \quad (14)$$

$$Rec'_L[x, y] = (2 \times Rec_L[2x, 2y + 1] + \quad (15)$$
$$Rec_L[2x - 1, 2y + 1] + Rec_L[2x + 1, 2y + 1] + 2) \gg 2$$

$$Rec'_L[x, y] = (Rec_L[2x + 1, 2y] + Rec_L[2x + 1, 2y + 1] + 1) \gg 1 \quad (16)$$

$$Rec'_L[x, y] = [Rec_L(2x - 1, 2y) + \quad (17)$$
$$3 \cdot Rec_L(2x, 2y) + 3 \cdot Rec_L(2x + 1, 2y) + Rec_L(2x + 2, 2y) +$$
$$Rec_L(2x - 1, 2y + 1) + 3 \cdot Rec_L(2x, 2y + 1) + 8] \gg 4$$

$$Rec'_L[x, y] = [Rec_L(2x - 1, 2y - 1) + \quad (18)$$
$$2 \cdot Rec_L(2x, 2y - 1) + Rec_L(2x + 1, 2y - 1) + 2 \cdot$$
$$Rec_{L\square}(2x - 1, 2y) + 4 \cdot Rec_L(2x, 2y) +$$
$$2 \cdot Rec_L(2x + 1, 2y) + Rec_L(2x - 1, 2y + 1) + 2 \cdot$$
$$Rec_L(2x, 2y + 1) + Rec_L(2x + 1, 2y + 1) + 8] \gg 4$$

$$Rec'_L[x, y] = [Rec_L(2x, 2y - 1) + \quad (19)$$
$$Rec_L(2x + 1, 2y - 1) + 2 \cdot Rec_L(2x, 2y) + 3 \cdot Rec_L(2x + 1, 2y) +$$
$$Rec_L(2x, 2y + 1) + Rec_L(2x + 1, 2y + 1) + 4] \gg 3$$

Figure 7:
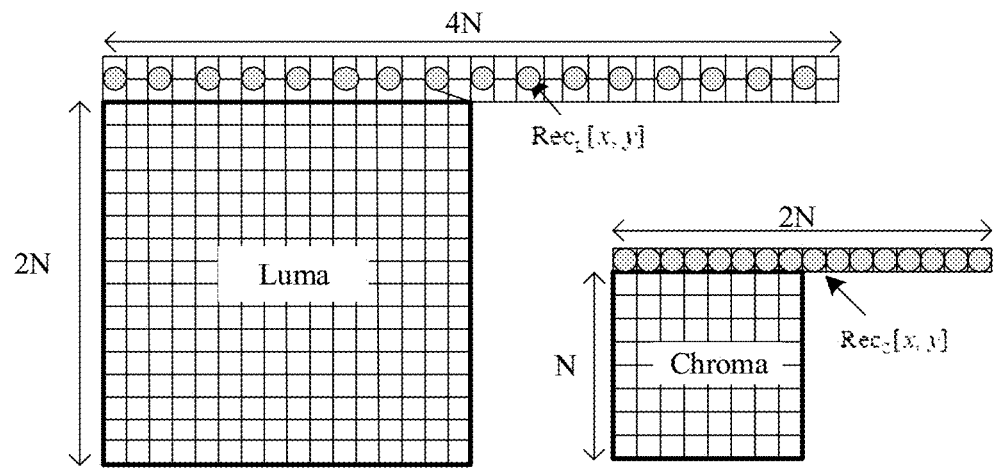
FIG. 7 shows the LM_A mode.
Figure 8:
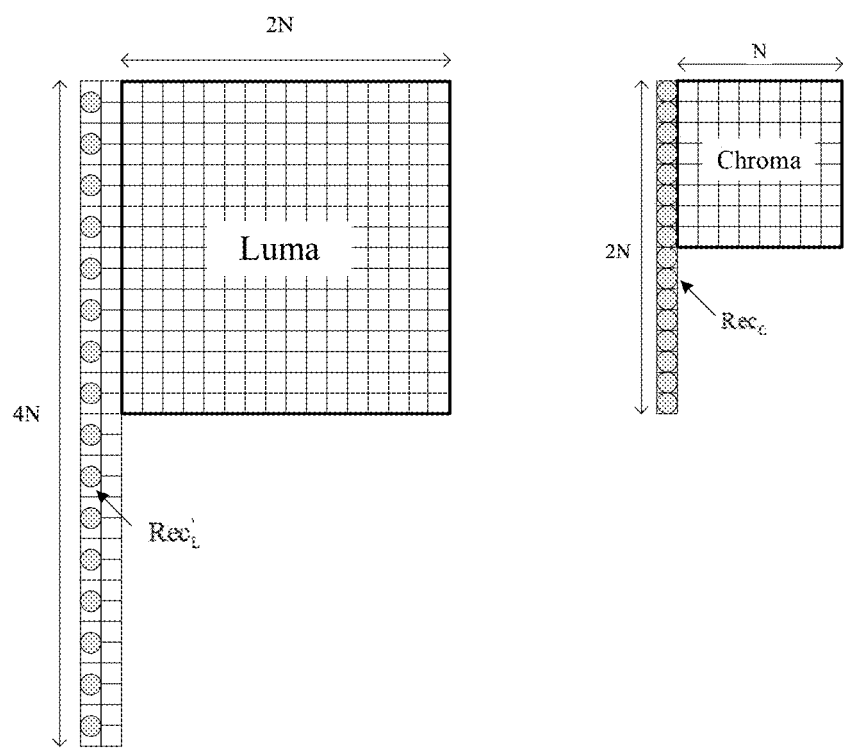
FIG. 8 shows the LM_L mode.
Figure 9:
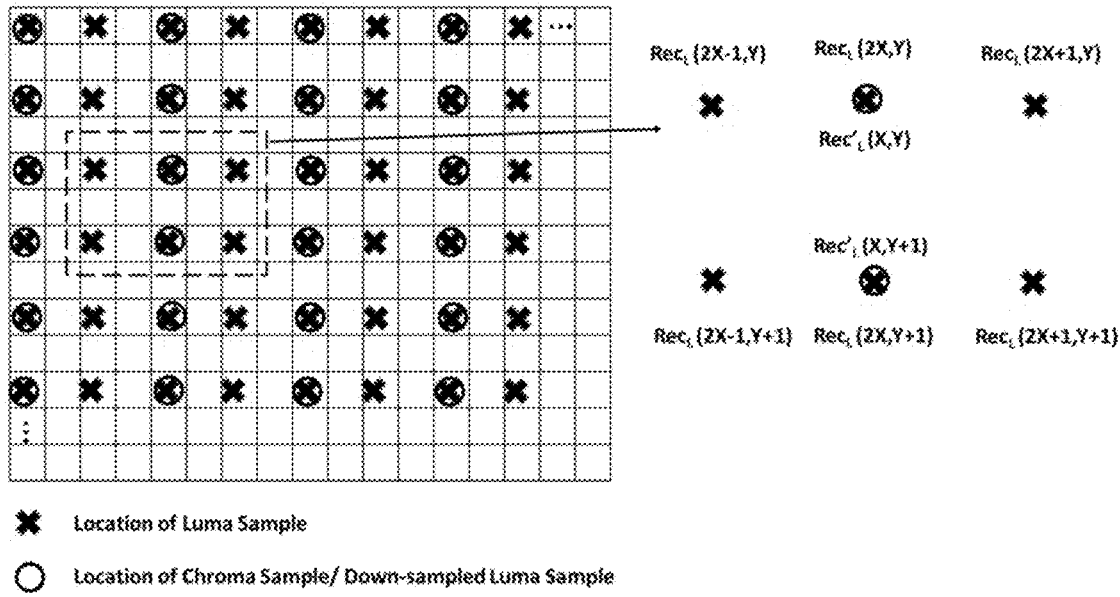
FIG. 9 is Luma/Chroma Pixel Sampling Grid for YUV 4:2:2 format.
Figure 10:
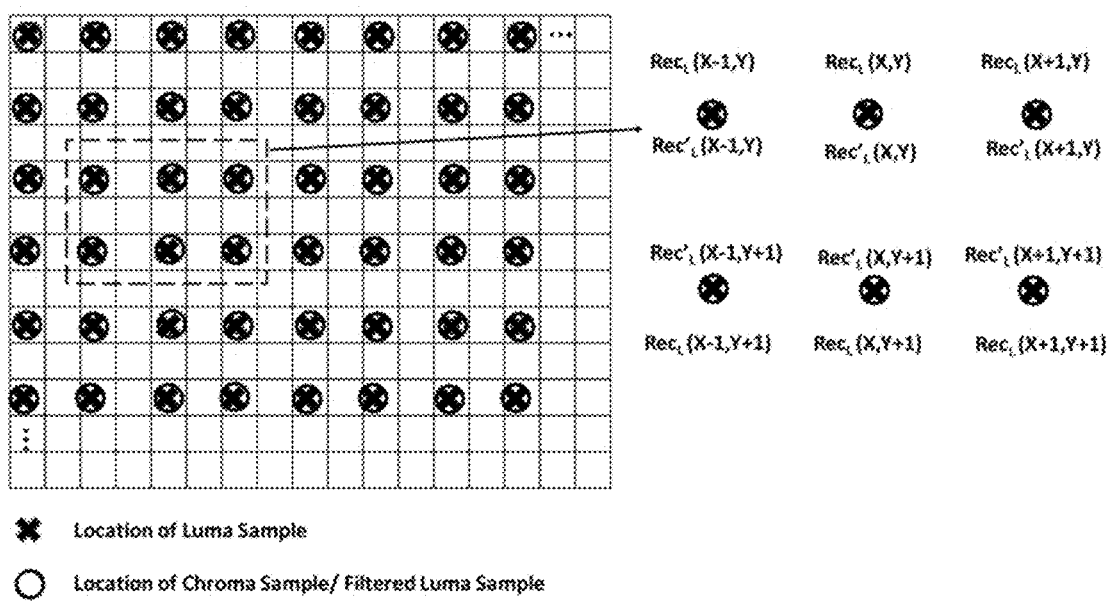
FIG. 10 is Luma/Chroma Pixel Sampling Grid for YUV 4:4:4 format.

Besides the above template and left template can be used to calculate the linear model coefficients together, they also can be used alternatively in the other 2 LM modes, called LM_A, and LM_L modes, respectively. As shown in FIG. 7, in LM_A mode, the above template is used to calculate the linear model coefficients. To get more samples, the above template is extended to (W+H). As shown in FIG. 8, in LM_L mode, only left template is used to calculate the linear model coefficients. To get more samples, the left template is extended to (H+W). For a non-square block, the above templates are extended to W+W, the left template are extended to H+H. When the above/left template is not available, then the LM_A/LM_L mode will not be checked or signaled. When the available samples not enough, the template will be padded by copying the right-most (for top template) sample or the below-most (for left template) sample to the nearest log 2 number. Besides 4:2:0 YUV format, the codec may also support 4:2:2 (as shown in FIG. 9) and 4:4:4 format (as shown in FIG. 10).

Several methods to improve LM modes are proposed in the JVET meeting as described below.

MMLM-mode: MMLM refers to multi-model LM mode, where two linear models are used to derive the chroma sample prediction. The reconstructed luma values are partitioned into two categories: one model is applied for each category. The derivation of the α and 0 parameters for each model is done as in the CCLM-mode; where the reconstructed luma (down-sampled) used to derive the parameters are also partitioned for each model accordingly.

MFLM-mode: MFLM refers to multi-filter LM mode, where different filters are used to down-sample the reconstructed luma samples used in the prediction model. Four such filters are used, and the particular filter used is indicated/signaled in the bitstream.

LM Angular prediction: In this mode, MMLM mode and a non-LM mode are combined by averaging the prediction samples obtained by the two modes.

Figure 11:
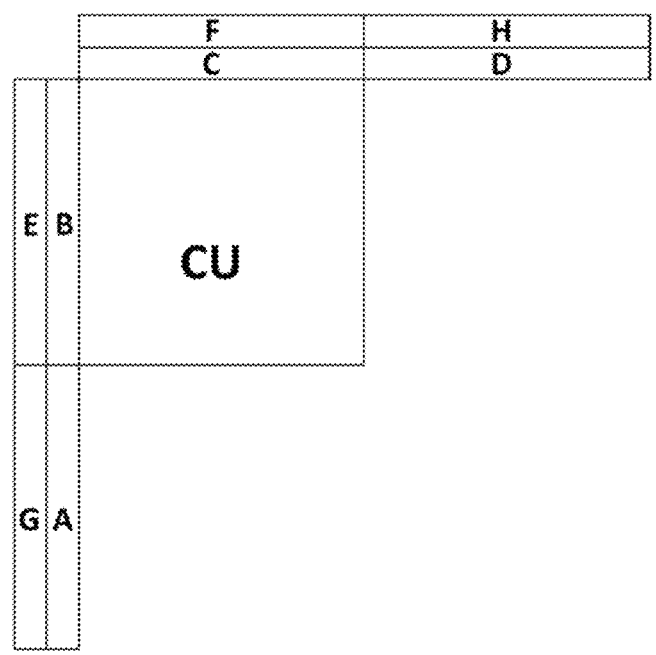
FIG. 11 shows the multiple neighbors for MMLM.

Multiple Neighbor-based Linear Model (MNLM) uses multiple neighbor sets for MMLM derivation to cover various linear relationships between luma samples and chroma samples in CU. As depicted in FIG. 11, three MMLM with different neighbor sets are proposed in MNLM:

MMLM: A, B, C, D (including above and left neighbors)
Above-MMLM: C, D, F, H (including above-only neighbors)
Left-MMLM: A, B, E, G (including left-only neighbors)

As illustrated in FIG. 11, A is the second left neighbor. B is the first left neighbor. C is the first above neighbor. D is the second above neighbor. E is the third left neighbors. F is the third above neighbor. G is the fourth left neighbor. H is the fourth above neighbor.

The different CCLM prediction modes in MNLM are listed in the table below:

| Mode index | Description |
| --- | --- |
| 0 | CCLM (Above & Left neighbors) |
| 1 | MMLM (Above & Left neighbors) |
| 2 | MMLM (Above-only neighbors) |
| 3 | MMLM (Left-only neighbors) |

Mode 0, Mode 1, Mode 2, and Mode 3 use the same down-sampling filter, but different neighbor sets for LM and MMLM derivation.

Figure 12:
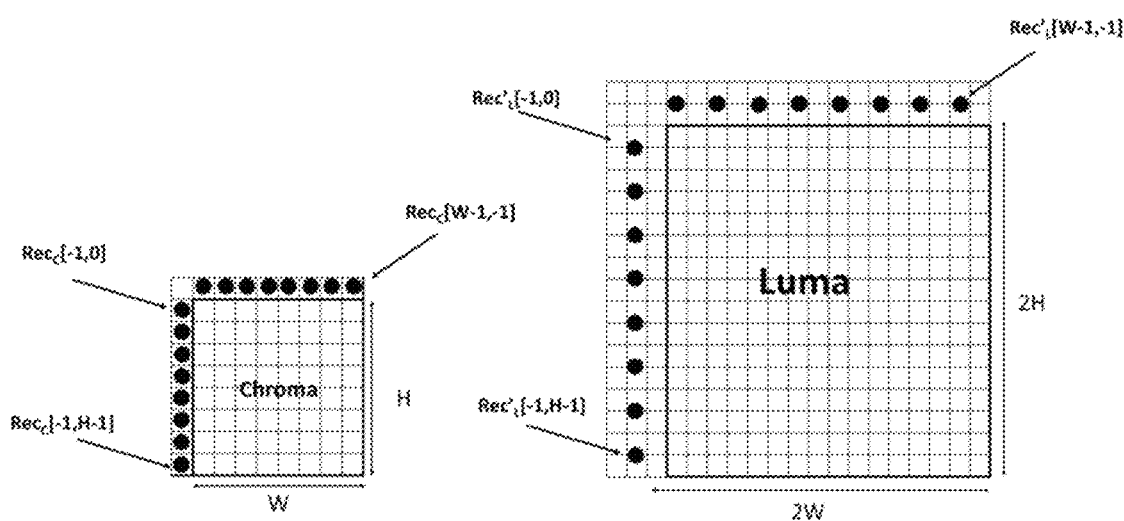
FIG. 12 shows the locations of an example of three sample pairs.

To reduce the complexity of the derivation of the CCLM parameters, in the first embodiment, three sample pairs are used to derive the parameter $\alpha$ and the parameter $\beta$. As shown in FIG. 12, the sample pairs include: the top sample of the left neighboring samples(Rec'$_L$ [−1,0], Rec$_c$ [−1,0]), the bottom sample of the left neighboring samples(Rec'$_L$ [−1, H−1], Rec$_c$[−1, H−1]), and the rightmost sample of the above neighboring samples(Rec'$_L$ [W−1, −1], Rec$_c$ [W−1, −1]). W and H denote the width and height of the chroma block.

Figure 13:
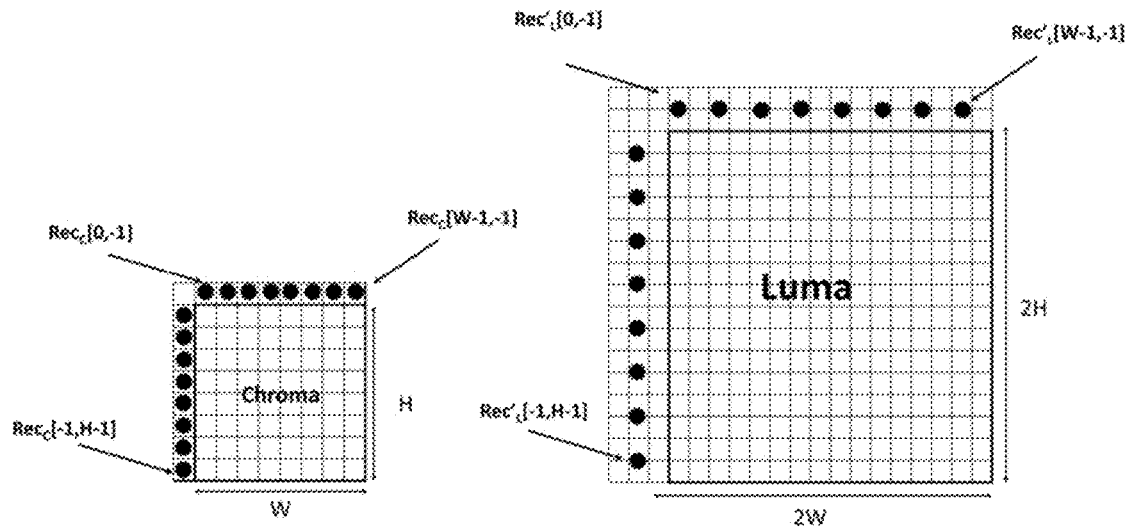
FIG. 13 shows the locations of another example of three sample pairs.

In another embodiment, As shown in FIG. 13, the sample pairs include: the leftmost sample of the above neighboring samples(Rec'$_L$ [0, −1], Rec$_c$[0, −1]), the bottom sample of the left neighboring samples(Rec'$_L$ [−1, H−1], Rec$_c$[−1, H−1]), and the rightmost sample of the above neighboring samples(Rec'$_L$ [W−1, −1], Rec$_c$[W−1, −1]).

It is noted that, the sample pair selection is not restricted to the mentioned embodiments. The three sample pairs could be any three sample pairs selected from the above or left reconstructed neighboring samples and the neighboring samples are not restricted to be only one line above or one line left.

In one embodiment, the sample pairs which respectively have the largest luma sample value, the middle sample value, and the smallest luma sample value are identified through luma sample comparisons. The weighted average of the luma sample values of the maximum and middle sample pairs is denoted as $x_B$ (as shown in equation (20)) and the weighted average of the chroma sample values of the maximum and middle sample pair is denoted as $y_B$ (as shown in equation (22)); the weighted average of the luma sample values of the middle and minimum sample pairs is denoted as $x_A$ (as shown in equation (21))and the weighted average of the chroma sample values of the middle and minimum sample pairs is denoted as $y_A$ (as shown in equation (23)). The parameter $\alpha$ and parameter $\beta$ are then calculated using the equation (2).

$$x_B = (w1 * x_{max} + w2 * x_{mid} + \mathit{offset}1) \gg N1; \quad (20)$$

$$x_A = (w3 * x_{mid} + w4 * x_{min} + \mathit{offset}2) \gg N2; \quad (21)$$

$$y_B = (w1 * y_{max} + w2 * y_{mid} + \mathit{offset}1) \gg N1; \quad (22)$$

$$y_A = (w3 * y_{mid} + w4 * y_{min} + \mathit{offset}2) \gg N2; \quad (23)$$

where $x_{max}$ is the luma sample values of the maximum sample pair, $x_{mid}$ is the luma sample values of the middle sample pair, $x_{min}$ is the luma sample values of the minimum sample pair, $y_{max}$ is the chroma sample values of the maximum sample pair, $y_{mid}$ is the chroma sample values of the middle sample pair, $y_{min}$ is the chroma sample values of the minimum sample pair; w1+w2=(1<<N1), offset1=1<<(N1−1); w3+w4=(1<<N2), offset2=1<<(N2−1).

Where w1 is a first weight factor, w2 is a second weight factor, w3 is a third weight factor, w4 is a fourth weight factor; N1 is the first average value, N2 is the second average value; offset1 is a first offset factor, offset2 is a second offset factor.

In one example where equal weighting is applied, w1=1, w2=1, w3=1, w4=1; N1=1, N2=1 and offset1=1, offset2=1.

In yet another example, w1=3, w2=1, w3=1, w4=3; N1=2, N2=2 and offset1=2, offset2=2.

In yet another embodiment, using i, j, k as the index for the three sample pairs, only two compares are performed between luma$_i$ and luma$_j$, luma$_i$ and luma$_k$. With the two comparisons, the three sample pairs could be either fully sorted by luma values or be divided into two groups; one contains two larger values and the other one contains one smaller value or vice versa. When the values are fully sorted, the methods as described in previous section could be used. When the sample pairs are divided into two groups, the luma and chroma sample(s) in the same group are weighted averaged, respectively (the single sample pair in a group practically does not need perform weighted average). For example, when there are two sample pairs in one group, the two luma values in one group are averaged with equal weights while the two chroma values are also averaged with equal weights. Here, the weighted averaged values are used as the $x_A$, $x_B$, $y_A$ and $y_B$ to derive CCLM parameter using (2).

In yet another embodiment, the sample pair which has the largest luma sample value and the sample pair which has the smallest luma sample value are identified through luma sample comparisons. The luma sample value of the maximum sample pair is denoted as $x_B$ and the chroma sample value of the maximum sample pair is denoted as $y_B$; the luma sample value of the minimum sample pair is denoted as $x_A$ and the chroma sample value of the minimum sample pair is denoted as $y_A$. The parameter $\alpha$ and parameter $\beta$ are then calculated using the equation (2).

It is noted that, the derivation method for CCLM parameters is not restricted to the mentioned embodiments. The selected three sample pairs could be used in any manner to derive the CCLM parameters.

Figure 14:
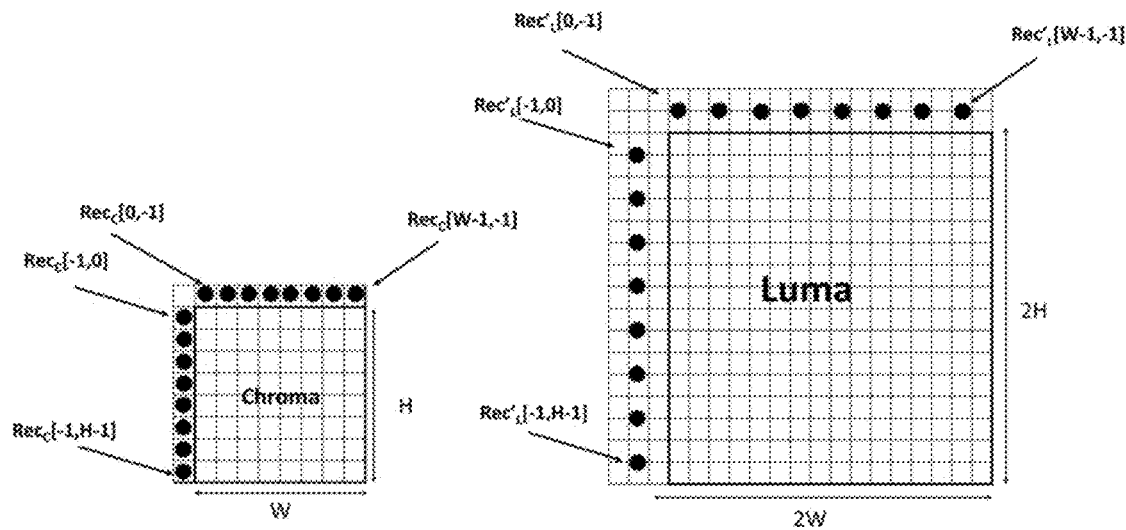
FIG. 14 shows the locations of an example of four sample pairs.

In the second embodiment, to reduce the complexity of the derivation of the CCLM parameters, use four sample pairs to derive the parameter α and the parameter β. As shown in FIG. 14, the sample pairs include: the top sample of the left neighboring samples(Rec'$_L$ [−1,0], Rec$_C$[−1,0]), the leftmost sample of the above neighboring samples(Rec'$_L$ [0, −1], Rec$_c$[0, −1]), the bottom sample of the left neighboring samples(Rec'$_L$ [−1, H−1], Rec$_c$[−1, H−1]), and the rightmost sample of the above neighboring samples(Rec'$_L$ [W−1, −1], Rec$_c$[W−1, −1]).

Figure 15:
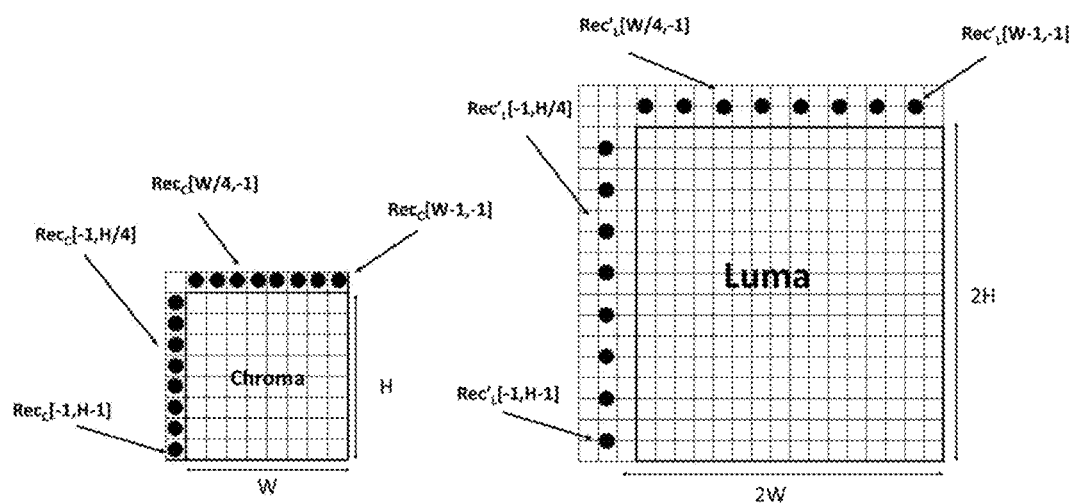
FIG. 15 shows the locations of another example of four sample pairs.

In another embodiment, As shown in FIG. 15, the sample pairs include: the quarter of width of the leftmost sample of the above neighboring samples(Rec'$_L$ [W/4, −1], Rec$_c$ [W/4, 1]), the quarter of height of the top sample of the left neighboring samples(Rec'$_L$ [−1, H/4], Rec$_c$ [−1, H/4]), the bottom sample of the left neighboring samples(Rec'$_L$ [−1, H−1], Rec$_c$[−1, H−1]), and the rightmost sample of the above neighboring samples(Rec'$_L$ [W−1, −1], Rec$_c$[W−1, −1]).

It is noted that, the sample pair selection is not restricted to the mentioned embodiments. The four sample pairs could be any four sample pairs selected from the above or left reconstructed neighboring samples and the neighboring samples are not restricted to be only one line above or one line left. For example, one sample pair sets include: the quarter of width of the leftmost sample of the above neighboring samples, the quarter of height of the top sample of the left neighboring samples, the three quarter of width of the leftmost sample of the above neighboring samples, the three quarter of height of the top sample of the left neighboring samples.

Alternatively, another sample pair sets include: the one-eighth of width of the leftmost sample of the above neighboring samples, the three-eighth of width of the leftmost sample of the above neighboring samples, the five-eighth of width of the leftmost sample of the above neighboring samples, the seven-eighth of width of the leftmost sample of the above neighboring samples.

Alternatively, another sample pair sets include: the one-eighth of height of the top sample of the left neighboring samples, the three-eighth of height of the top sample of the left neighboring samples, the five-eighth of height of the top sample of the left neighboring samples, the seven-eighth of height of the top sample of the left neighboring samples.

In one embodiment, the sample pairs which respectively have the two larger luma sample value and the two smaller luma sample value are identified through luma sample comparisons. The luma sample values of the two larger sample pairs are denoted as $x_{B0}$, $x_{B1}$ and the chroma sample value of the two larger sample pairs are denoted as $y_{B0}$, $y_{B1}$; the luma sample values of the two smaller sample pairs are denoted as $x_{A0}$, $x_{A1}$ and the chroma sample values of the two smaller sample pairs are denoted as $y_{A0}$, $y_{A1}$. As illustrated in the equation below, equation (24)-(27), the $x_A$, $x_B$, $y_A$ and $y_B$ are then derived as the weighted average of the $x_{A0}$, $x_{A1}$, $x_{B0}$, $x_{B1}$, $y_{A0}$, $y_{A1}$ and $y_{B0}$, $y_{B1}$. The parameter α and parameter β are then calculated using the equation (2).

$$x_A = (w1 * x_{A0} + w2 * x_{A1} + \textit{offset1}) \gg N1 \quad (24)$$

$$x_B = (w3 * x_{B0} + w4 * x_{B1} + \textit{offset2}) \gg N2 \quad (25)$$

$$y_A = (w1 * y_{A0} + w2 * y_{A1} + \textit{offset1}) \gg N1 \quad (26)$$

$$y_B = (w3 * y_{B0} + w4 * y_{B1} + \textit{offset2}) \gg N2 \quad (27)$$

where w1+w2=(1<<N1), offset1=1<<(N1−1); w3+w4=(1<<N2), offset2=1<<(N2−1). where w1 is a first weight factor, w2 is a second weight factor, w3 is a third weight factor, w4 is a fourth weight factor; N1 is the first average value, N2 is the second average value; offset1 is a first offset factor, offset2 is a second offset factor.

In one example where equal weighting is applied, w1=1, w2=1, w3=1, w4=1; N1=1, N2=1 and offset1=1, offset2=1.

In yet another example, w1=3, w2=1, w3=1, w4=3; N1=2, N2=2 and offset1=2, offset2=2.

In another embodiment, the sample pairs which respectively have the largest luma sample value and the smallest luma sample value are identified through luma sample comparisons. The luma sample value of the maximum sample pair is denoted as $x_B$ and the chroma sample value of the maximum sample pair is denoted as $y_B$; the luma sample value of the minimum sample pair is denoted as $x_A$ and the chroma sample value of the minimum sample pair is denoted as $y_A$. The parameter α and parameter β are then calculated using the equation (2).

It is noted that, the derivation method for CCLM parameters is not restricted to the mentioned embodiments. The four selected sample pairs could be used in any manner to derive the CCLM parameters.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact examples described above and illustrated in the accompanying drawings, and that various modifications and changes can be made without departing from the scope thereof. It is intended that the scope of the invention only be limited by the appended claims.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

Further, the above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact examples described above and illustrated in the accompanying drawings, and that various modifications and changes can be made without departing from the scope thereof. It is intended that the scope of the invention only be limited by the appended claims.

What is claimed is:

1. A method for video decoding, comprising:
deriving a first parameter α and a second parameter β for a cross-component linear model (CCLM) mode by using a number of neighboring reconstructed luma samples and neighboring chroma samples of a coding unit (CU); and
generating a predicted chroma sample of the CU by using the first parameter a and the second parameter β;
wherein deriving the first parameter α and the second parameter β comprises deriving the first parameter a and the second parameter β by using four neighboring down-sampled luma samples and four corresponding chroma samples, wherein each down-sampled luma sample and its corresponding chroma sample correspond to the same row index and the same column index; and
wherein deriving the first parameter α and the second parameter β by using four neighboring down-sampled luma samples and four corresponding chroma samples comprises:
obtaining the first parameter α and the second parameter β by using a weighted average luma value $x_A$ of two smaller luma samples $x_{A0}$, $x_{A1}$ from the four neighboring down-sampled luma samples, a weighted average luma value $x_B$ of two larger luma samples $x_{B0}$, $x_{B1}$ from the four neighboring down-sampled luma samples, a weighted average chroma value $y_A$ of two chroma samples $y_{A0}$, $y_{A1}$ corresponding to the two smaller luma samples, and a weighted average chroma value $y_B$ of two chroma samples $y_{B0}$, $y_{B1}$ corresponding to the two larger luma samples,
wherein $x_A$, $x_B$, $y_A$, and $y_B$ are obtained based on following equations:

$$x_A = (w1 * x_{A0} + w2 * x_{A1} + offset1) \gg N1;$$

$$x_B = (w3 * x_{B0} + w4 * x_{B1} + offset2) \gg N2;$$

$$y_A = (w1 * y_{A0} + w2 * y_{A1} + offset1) \gg N1;$$

$$y_B = (w3 * y_{B0} + w4 * y_{B1} + offset2) \gg N2;$$

wherein w1+w2=(1<<N1), offset 1=1<<(N 1−1), w3+w4=(1<<N2), offset2=1<<(N2−1), wherein w1 is a first weight factor, w2 is a second weight factor, w3 is a third weight factor, w4 is a fourth weight factor, N1 is a first shift value, N2 is a second shift value, offset1 is a first offset factor, and offset2 is a second offset factor.

2. The method of claim 1, wherein generating the predicted chroma sample comprises:
obtaining the predicted chroma sample based on following equation:

$$Pred_c(x, y) = \alpha * rec'_L(x, y) + \beta$$

wherein $pred_c(x, y)$ is the predicted chroma sample, $rec_L'(x, y)$ is down-sampled reconstructed luma samples of the CU, x indicates a row index, and y indicates a column index.

3. The method of claim 1, wherein deriving the first parameter α and the second parameter β by using neighboring chroma samples and their corresponding down-sampled luma samples comprises:
obtaining the first parameter α and the second parameter β based on following equations:

$$\alpha = \frac{y_B - y_A}{x_B - x_A}$$

$$\beta = y_A - \alpha x_A$$

wherein $x_A$, $x_B$, $y_A$ and $y_B$ are derived based on weighted averages of the neighboring chroma samples and their corresponding down-sampled luma samples.

4. The method of claim 2, wherein the four neighboring down-sampled luma samples and four corresponding chroma samples include one of the following sets:
the top sample of the left neighboring samples, the leftmost sample of the above neighboring samples, the bottom sample of the left neighboring samples, and the rightmost sample of the above neighboring samples;
the quarter of width of the leftmost sample of the above neighboring samples, the quarter of height of the top sample of the left neighboring samples, the bottom sample of the left neighboring samples, and the rightmost sample of the above neighboring samples;
the quarter of width of the leftmost sample of the above neighboring samples, the quarter of height of the top sample of the left neighboring samples, the three quarter of width of the leftmost sample of the above neighboring samples, the three quarter of height of the top sample of the left neighboring samples;
the one-eighth of width of the leftmost sample of the above neighboring samples, the three-eighth of width of the leftmost sample of the above neighboring samples, the five-eighth of width of the leftmost sample of the above neighboring samples, the seven-eighth of width of the leftmost sample of the above neighboring samples; and
the one-eighth of height of the top sample of the left neighboring samples, the three-eighth of height of the top sample of the left neighboring samples, the five-eighth of height of the top sample of the left neighboring samples, the seven-eighth of height of the top sample of the left neighboring samples.

5. A computing device, comprising:
at least one processor;

a non-transitory storage coupled to the one or more processors; and
a plurality of programs stored in the non-transitory storage that, when executed by the processor, cause the computing device to perform acts comprising:
deriving a first parameter α and a second parameter β for a cross-component linear model (CCLM) mode by using a number of neighboring reconstructed luma samples and neighboring chroma samples of a coding unit (CU); and
generating a predicted chroma sample of the CU by using the first parameter α and the second parameter β;
wherein deriving the first parameter α and the second parameter β comprises deriving the first parameter α and the second parameter β by using four neighboring down-sampled luma samples and four corresponding chroma samples, wherein each down-sampled luma sample and its corresponding chroma sample correspond to the same row index and the same column index; and
wherein deriving the first parameter α and the second parameter β by using four neighboring down-sampled luma samples and four corresponding chroma samples comprises:
obtaining the first parameter α and the second parameter β by using a weighted average luma value $x_A$ of two smaller luma samples $x_{A0}$, $x_{A1}$ from the four neighboring down-sampled luma samples, a weighted average luma value $x_B$ of two larger luma samples $x_{B0}$, $x_{B1}$ from the four neighboring down-sampled luma samples, a weighted average chroma value $y_A$ of two chroma samples $y_{A0}$, $y_{A1}$ corresponding to the two smaller luma samples, and a weighted average chroma value $y_B$ of two chroma samples $y_{B0}$, $y_{B1}$ corresponding to the two larger luma samples,
wherein $x_A$, $x_B$, $y_A$, and $y_B$ are obtained based on following equations:

$$x_A = (w1 * x_{A0} + w2 * x_{A1} + \mathit{offset1}) \gg N1;$$
$$x_B = (w3 * x_{B0} + w4 * x_{B1} + \mathit{offset2}) \gg N2;$$
$$y_A = (w1 * y_{A0} + w2 * y_{A1} + \mathit{offset1}) \gg N1;$$
$$y_B = (w3 * y_{B0} + w4 * y_{B1} + \mathit{offset2}) \gg N2;$$

wherein w1+w2=(1<<N1), offset1=1<<(N1−1), w3+w4=(1<<N2), offset2=1<<(N2−1),
wherein w1 is a first weight factor, w2 is a second weight factor, w3 is a third weight factor, w4 is a fourth weight factor, N1 is a first average shift value, N2 is a second average shift value, offset1 is a first offset factor, and offset2 is a second offset factor.

6. The computing device of claim 5, wherein generating the predicted chroma sample comprises:
obtaining the predicted chroma sample based on following equation:

$$\mathit{Pred}_c(x, y) = \alpha * \mathit{rec}'_L(x, y) + \beta$$

wherein $\mathit{pred}_c(x, y)$ is the predicted chroma sample, $\mathit{rec}_L'(x, y)$ is the down-sampled reconstructed luma samples of the CU, x indicates a row index, and y indicates a column index.

7. The computing device of claim 5, wherein deriving the first parameter α and the second parameter β by using neighboring chroma samples and their corresponding down-sampled luma samples comprises:
obtaining the first parameter α and the second parameter β based on following equations:

$$\alpha = \frac{y_B - y_A}{x_B - x_A}$$
$$\beta = y_A - \alpha x_A$$

wherein $x_A$, $x_B$, $y_A$ and $y_B$ are derived based on weighted averages of the neighboring chroma samples and their corresponding down-sampled luma samples.

8. The computing device of claim 6, wherein the four neighboring down-sampled luma samples and four corresponding chroma samples include one of the following sets:
the top sample of the left neighboring samples, the leftmost sample of the above neighboring samples, the bottom sample of the left neighboring samples, and the rightmost sample of the above neighboring samples;
the quarter of width of the leftmost sample of the above neighboring samples, the quarter of height of the top sample of the left neighboring samples, the bottom sample of the left neighboring samples, and the rightmost sample of the above neighboring samples;
the quarter of width of the leftmost sample of the above neighboring samples, the quarter of height of the top sample of the left neighboring samples, the three quarter of width of the leftmost sample of the above neighboring samples, the three quarter of height of the top sample of the left neighboring samples;
the one-eighth of width of the leftmost sample of the above neighboring samples, the three-eighth of width of the leftmost sample of the above neighboring samples, the five-eighth of width of the leftmost sample of the above neighboring samples, the seven-eighth of width of the leftmost sample of the above neighboring samples; and
the one-eighth of height of the top sample of the left neighboring samples, the three-eighth of height of the top sample of the left neighboring samples, the five-eighth of height of the top sample of the left neighboring samples, the seven-eighth of height of the top sample of the left neighboring samples.

9. A non-transitory computer readable storage medium storing bitstream that when received by a decoding device causes the decoding device to perform acts comprising:
deriving a first parameter α and a second parameter β for a cross-component linear model (CCLM) mode by using a number of neighboring reconstructed luma samples and neighboring chroma samples of a coding unit (CU); and
generating a predicted chroma sample of the CU by using the first parameter α and the second parameter β;
wherein deriving the first parameter α and the second parameter β comprises deriving the first parameter α and the second parameter β by using four neighboring down-sampled luma samples and four corresponding chroma samples, wherein each down-sampled luma sample and its corresponding chroma sample correspond to the same row index and the same column index; and wherein deriving the first parameter α and the second parameter β by using four neighboring down-sampled luma samples and four corresponding chroma samples comprises:

obtaining the first parameter α and the second parameter β by using a weighted average luma value $x_A$ of two smaller luma samples $x_{A0}$, $x_{A1}$ from the four neighboring down-sampled luma samples, a weighted average luma value $x_B$ of two larger luma samples $x_{B0}$, $x_{B1}$ from the four neighboring down-sampled luma samples, a weighted average chroma value $y_A$ of two chroma samples $y_{A0}$, $y_{A1}$ corresponding to the two smaller luma samples, and a weighted average chroma value $y_B$ of two chroma samples $y_{B0}$, $y_{B1}$ corresponding to the two larger luma samples, wherein $x_A$, $x_B$, $y_A$, and $y_B$ are obtained based on following equations:

$$x_A = (w1 * x_{A0} + w2 * x_{A1} + \textit{offset}1) \gg N1;$$

$$x_B = (w3 * x_{B0} + w4 * x_{B1} + \textit{offset}2) \gg N2;$$

$$y_A = (w1 * y_{A0} + w2 * y_{A1} + \textit{offset}1) \gg N1;$$

$$y_B = (w3 * y_{B0} + w4 * y_{B1} + \textit{offset}2) \gg N2;$$

wherein w1+w2=(1<<N1), offset1=1<<(N1−1), w3+w4=(1<<N2), offset2=1<<(N2−1), wherein w1 is a first weight factor, w2 is a second weight factor, w3 is a third weight factor, w4 is a fourth weight factor, N1 is a first shift value, N2 is a second shift value, offset1 is a first offset factor, and offset2 is a second offset factor.

10. The non-transitory computer readable storage medium of claim 9, wherein generating the predicted chroma sample comprises:

obtaining the predicted chroma sample based on following equation:

$$Pred_c(x, y) = \alpha * rec'_L(x, y) + \beta$$

wherein $pred_c(x, y)$ is the predicted chroma sample, $rec_L'(x, y)$ is down-sampled reconstructed luma samples of the CU, x indicates a row index, and y indicates a column index.

11. The non-transitory computer readable storage medium of claim 9, wherein deriving the first parameter α and the second parameter β by using neighboring chroma samples and their corresponding down-sampled luma samples comprises:

obtaining the first parameter α and the second parameter β based on following equations:

$$\alpha = \frac{y_B - y_A}{x_B - x_A}$$

$$\beta = y_A - \alpha x_A$$

wherein $x_A$, $x_B$, $y_A$ and $y_B$ are derived based on weighted averages of the neighboring chroma samples and their corresponding down-sampled luma samples.

12. The non-transitory computer readable storage medium of claim 10, wherein the four neighboring down-sampled luma samples and four corresponding chroma samples include one of the following sets:

the top sample of the left neighboring samples, the leftmost sample of the above neighboring samples, the bottom sample of the left neighboring samples, and the rightmost sample of the above neighboring samples;

the quarter of width of the leftmost sample of the above neighboring samples, the quarter of height of the top sample of the left neighboring samples, the bottom sample of the left neighboring samples, and the rightmost sample of the above neighboring samples;

the quarter of width of the leftmost sample of the above neighboring samples, the quarter of height of the top sample of the left neighboring samples, the three quarter of width of the leftmost sample of the above neighboring samples, the three quarter of height of the top sample of the left neighboring samples;

the one-eighth of width of the leftmost sample of the above neighboring samples, the three-eighth of width of the leftmost sample of the above neighboring samples, the five-eighth of width of the leftmost sample of the above neighboring samples, the seven-eighth of width of the leftmost sample of the above neighboring samples; and the one-eighth of height of the top sample of the left neighboring samples, the three-eighth of height of the top sample of the left neighboring samples, the five-eighth of height of the top sample of the left neighboring samples, the seven-eighth of height of the top sample of the left neighboring samples.

\* \* \* \* \*

UNITED STATES PATENT AND TRADEMARK OFFICE
CERTIFICATE OF CORRECTION

PATENT NO. : 11,843,770 B2  
APPLICATION NO. : 17/732483  
DATED : December 12, 2023  
INVENTOR(S) : Yi-Wen Chen et al.

Page 1 of 1

It is certified that error appears in the above-identified patent and that said Letters Patent is hereby corrected as shown below:

In the Claims

Column 13, Lines 53 and 54, Claim 5, delete the word "average".

Signed and Sealed this  
Twenty-fifth Day of November, 2025

John A. Squires  
*Director of the United States Patent and Trademark Office*